(12) United States Patent
Shearer

(10) Patent No.: US 7,557,330 B2
(45) Date of Patent: Jul. 7, 2009

(54) HEATED FLOOR PANEL WITH INTEGRATED CONTROLLER HAVING GROUND FAULT INTERRUPT CIRCUIT

(75) Inventor: Jon Douglas Shearer, Hartville, OH (US)

(73) Assignee: Goodrich Corporation, Charlotte, NC (US)

( * ) Notice: Subject to any disclaimer, the term of this patent is extended or adjusted under 35 U.S.C. 154(b) by 276 days.

(21) Appl. No.: 11/382,992

(22) Filed: May 12, 2006

(65) Prior Publication Data

US 2007/0262074 A1    Nov. 15, 2007

(51) Int. Cl.
*H05B 3/06* (2006.01)
(52) U.S. Cl. .................. 219/532; 219/213; 361/45
(58) Field of Classification Search ........... 219/532, 219/213, 530, 540, 501, 494, 510; 392/435–439; 327/85; 238/782; 361/45, 42, 46
See application file for complete search history.

(56) References Cited

U.S. PATENT DOCUMENTS

| | | | | |
|---|---|---|---|---|
| 4,055,777 A | * | 10/1977 | Black | 327/85 |
| 5,835,322 A | * | 11/1998 | Smith et al. | 361/45 |
| 6,691,923 B2 | * | 2/2004 | Shearer | 236/78 R |
| 6,834,159 B1 | * | 12/2004 | Schramm | 392/435 |

* cited by examiner

*Primary Examiner*—Thor S Campbell
(74) *Attorney, Agent, or Firm*—Renner, Otto, Boisselle & Sklar, LLP

(57) ABSTRACT

A fault protected aircraft heated floor panel is provided. The floor panel includes upper and lower floor panel skins and an electro-resistive heater element interposed between the upper and lower floor panel skins. The floor panel further includes a controller for controlling current delivered to the heater element, the controller including a ground fault interrupt circuit that detects excess reactive current provided to the heater element. The controller interrupts the current delivered to the heater element as a result of the ground fault interrupt circuit detecting the excess current.

19 Claims, 3 Drawing Sheets

HEATED FLOOR PANEL WITH INTEGRATED CONTROLLER HAVING GROUND FAULT INTERRUPT CIRCUIT

TECHNICAL FIELD

The invention relates generally to an aircraft heated floor panel and, more particularly, to an aircraft floor panel including a lower support layer, a heater layer, and a top metal layer for protecting the underlying layers from floor-traffic related damage.

BACKGROUND OF THE INVENTION

An aircraft will commonly include heated floor panels in order to help maintain the cabin at a comfortable temperature. The floor panel is typically supported by an aircraft structure and has a structural integrity sufficient to support the weight of people and objects resting on top thereof. A metal face sheet typically forms the top surface of the panel to protect the underlying layers from punctures from high heels, chips from dropped objects, scratches from dragged luggage and/or other floor-traffic related hazards.

An aircraft heated floor panel is usually made by compiling a series of layers together to form a lower support layer and a heater layer. The lower support layer may include, for example, a honeycomb layer surrounded by reinforcing fiber layers. The heater layer may include, for example, a resistance element disposed in layers of a thermosettable dielectric material. High temperature film adhesives and scrims are appropriately provided between the layers and the compiled layers are cured to form a composite structure. The composite structure is then cooled to room temperature and the metal face sheet layer is secured to the previously cured layers.

U.S. Pat. No. 6,834,159 describes another example of an aircraft heated floor panel. The floor panel includes a lower support layer, a heater layer, a metal face sheet layer for protecting the top of the panel from floor-traffic related damage, and a pressure sensitive adhesive layer bonding the metal face sheet layer to the underlying support/heater layers. The pressure sensitive adhesive (or other adhesive which retains elasticity after bonding) allows different rates of thermal expansion to be accommodated during the curing and cooling steps of the manufacturing process.

The resistance element within the heated floor panel typically receives AC power from an AC power source included in the aircraft. Current provided to the resistance element causes the resistance element to generate heat, thereby heating the floor panel. On the other hand, the delivery of the AC power to the heated floor panel naturally creates safety concerns. Consequently, the upper and lower layers, or skins, of the heated floor panel, are typically tied or "bonded" to electrical ground. If AC power from the resistance element was accidentally to appear at the upper or lower layer of the heated floor panel, e.g., due to breakdown of the dielectric material within the heater layer, etc., the power would be shorted to ground via what are commonly referred to as "bonding straps" which tie the panel to ground.

While such conventional techniques for providing safety from electrical hazards involving heated floor panels have enjoyed success, there have been some drawbacks. For example, despite the presence of the bonding straps, undesirable resistance may exist within the bonding strap and/or between the bonding strap and the floor panel or ground. This can result in what is nevertheless a small AC voltage on the surface(s) of the floor panel, thereby resulting in possible electrical hazard discomfort to the passengers.

In view of the aforementioned shortcomings associated with conventional heated floor panels, there is a strong need in the art for an aircraft heated floor panel that provides even better protection against electrical hazards.

SUMMARY OF THE INVENTION

According to an aspect of the invention, a fault protected aircraft heated floor panel is provided. The floor panel includes upper and lower floor panel skins and an electroresistive heater element interposed between the upper and lower floor panel skins. The floor panel further includes a controller for controlling current delivered to the heater element, the controller including a ground fault interrupt circuit that detects excess current provided to the heater element. The controller interrupts the current delivered to the heater element as a result of the ground fault interrupt circuit detecting the excess current.

According to another aspect, the controller is integral with the remainder of the floor panel.

In accordance with another aspect, the ground fault interrupt circuit detects whether a differential current between a power lead and a return lead that deliver the current to the heater element exceeds a predefined current upper limit.

According to yet another aspect, the ground fault interrupt circuit comprises a toroid through which both the power lead and the return lead pass in order to detect the differential current therebetween.

According to still another aspect, the ground fault interrupt circuit comprises a window comparator circuit for determining whether the differential current is within a window having an upper limit representing the predefined current upper limit, and a lower limit representing a predefined current lower limit.

With yet another aspect of the invention, the controller interrupts the current delivered to the heater element as a result of the ground fault interrupt circuit determining that the differential current is outside the window.

In accordance with still another aspect, the lower limit of the window is representative of a fault in a connection between at least one of the upper and lower floor panel skins and electrical ground.

According to another aspect, the controller comprises a temperature control portion that controls the current provided to the heater element as a function of a setpoint temperature for the floor panel.

In accordance with another aspect, the controller includes at least one solid state relay controlled by the temperature control portion to selectively provide current to the heater element.

In accordance with still another aspect, the controller interrupts the current delivered to the heater element by switching off the at least one solid state relay as a result of the ground fault interrupt circuit detecting the excess current.

According to another aspect of the invention, a method of providing fault protection in an aircraft heated floor panel is provided. The method includes the steps of detecting whether excess current is provided to a heater element included in the heated floor panel; and interrupting the current delivered to the heater element as a result of detecting the excess current.

According to another aspect, the step of detecting includes detecting whether a differential current between a power lead and a return lead that deliver the current to the heater element exceeds a predefined current limit.

With still another aspect, the method includes using a toroid through which both the power lead and the return lead pass in order to detect the differential current therebetween.

In yet another aspect, the method includes using a window comparator circuit for determining whether the differential current is within a window having an upper limit representing a predefined current upper limit, and a lower limit representing a predefined current lower limit.

According to still another aspect, the method includes interrupting the current delivered to the heater element as a result determining that the differential current is outside the window.

According to another aspect, the lower limit of the window is representative of a fault in a connection between at least one of the upper and lower floor panel skins and electrical ground.

In accordance with still another aspect, the method includes the step of controlling the current provided to the heater element as a function of a setpoint temperature for the floor panel.

With still another aspect, the method includes using at least one solid state relay to selectively provide current to the heater element.

According to another aspect, the current delivered to the heater element is interrupted by switching off the at least one solid state relay as a result of detecting the excess current.

According to an aspect of the invention, a fault protected aircraft heated floor panel is provided. The floor panel includes upper and lower floor panel skins and an electro-resistive heater element interposed between the upper and lower floor panel skins. The floor panel further includes a controller for controlling current delivered to the heater element, the controller including a ground fault interrupt circuit that detects a fault in a connection between at least one of the upper and lower floor panel skins and electrical ground.

To the accomplishment of the foregoing and related ends, the invention, then, comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

DETAILED DESCRIPTION OF THE INVENTION

The present invention will now be described with reference to the drawings, wherein like reference labels are used to refer to like elements throughout.

Due to the nature of the construction of heated floor panels, there is a large capacitive effect between the heating element and the skin of the panels. This large capacitive effect makes conventional ground fault interrupt (GFI) circuits inadequate for detecting ground faults. The reactive current due to the capacitive effect of the panels may be such under normal operating conditions as to exceed current levels of conventional GFI circuits. Thus, conventional GFI circuits are unable to determine if an actual ground fault has occurred.

The present invention relates to a heated floor panel with a ground fault interrupt circuit that monitors the reactive component of the ground fault current. The ground fault interrupt circuit verifies that the reactive current is within acceptable levels thereby validating the bonding and grounding of the panel. In the event the dielectric of the panel breaks down, an upper limit of reactive and/or real current will be exceeded resulting in the removal of power. If the bonding path is lost, no reactive current is detected, also resulting in the removal of power.

Figure 1:
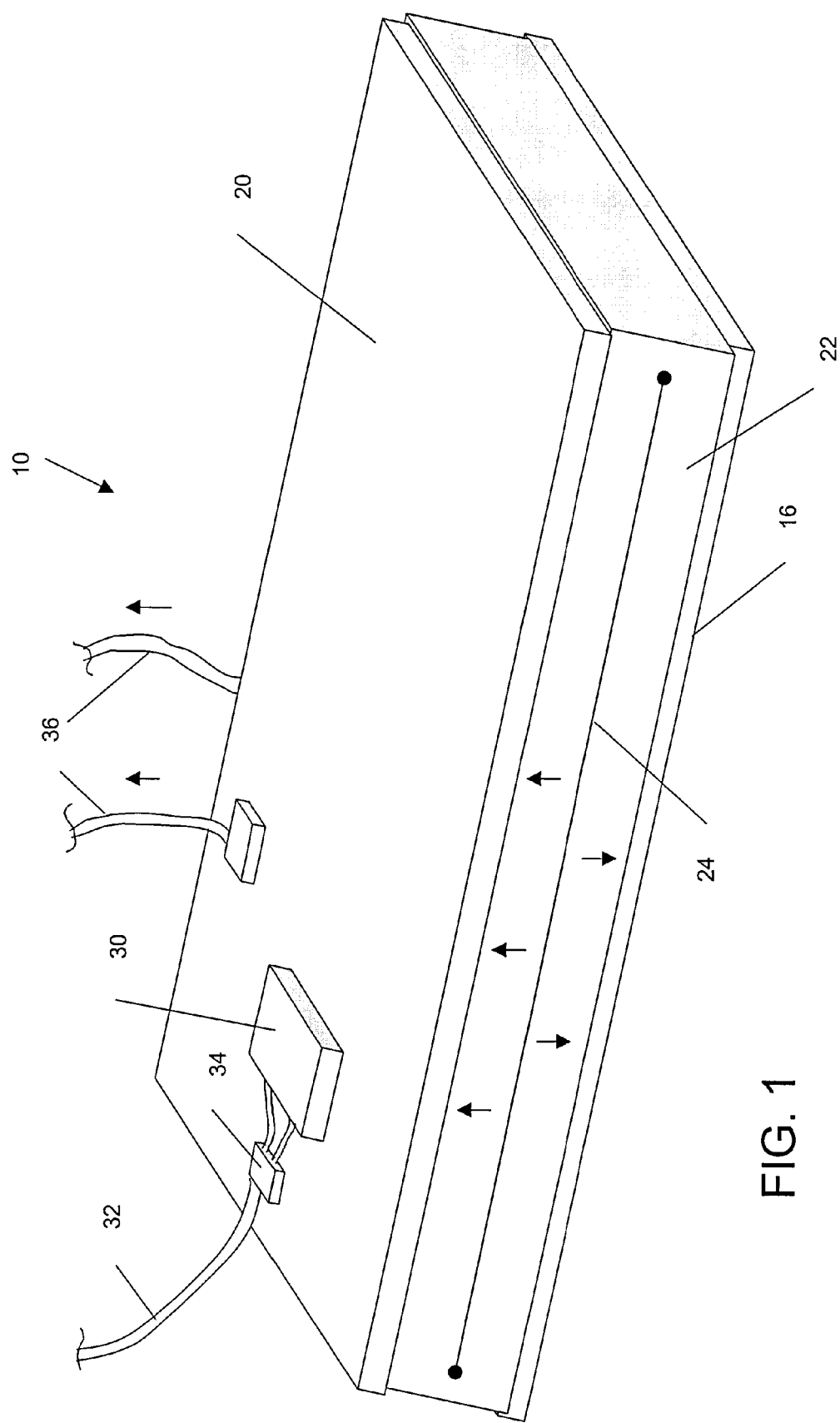
FIG. 1 is a perspective view of a heated floor panel in partial cutaway, the heated floor panel including a ground fault interrupt circuit according to an exemplary embodiment of the present invention.

Referring now to the drawings, and initially to FIG. 1, a floor panel 10 according to the present invention is shown. The floor panel 10 is designed to be installed in an aircraft in order to help maintain the aircraft cabin at a comfortable temperature, and is supported around its perimeter by aircraft structure. A metal face sheet 16 (e.g., aluminum or titanium) forms the upper surface or skin of the panel 10. (Note that the floor panel in FIG. 1 is shown inverted). The upper surface face sheet 16 protects the underlying layers of the panel 10 against punctures from high heels, chips from dropped objects, scratches from dragged luggage and/or other floor-traffic related hazards.

The floor panel 10 further includes a lower support sheet, or skin, formed by a support sheet 20, and a heater layer 22 interposed between the upper surface face sheet 16 and the lower support sheet 20. The support sheet 20 may be formed from a honeycomb layer (e.g., aramid) sandwiched between fiber (e.g. carbon fiber prepreg) and fiber layers (e.g., fiberglass epoxy prepreg). Additional and different support layers which provide the sufficient stiffness, satisfy the thickness limitations, and accommodate weight considerations may be used. As will be appreciated by those having ordinary skill in the art, the particular composition of the various layers making up the floor panel 10 is not germane to the invention in the broadest sense.

The heater layer 22 may be an electro-thermal heater, that is it may comprise an electrically resistive heater element 24 electrically isolated in a dielectric. The heater element 24 may be an etched foil type element or a wire and/or the element may be configured in a zig-zag type arrangement, etc. The heater element 24 may be isolated by encapsulation by disposing it between plies of an appropriate curable material such as thermoset plastic or any other dielectric or electrically non-conductive material. For example, the plies may be made of a polyamide film, such as Kapton® available from the E. I. Dupont DeNeumours Company.

In the exemplary embodiment, the heated floor panel 10 includes an integrated controller 30 for providing temperature control to the floor panel 10, and specifically for providing current control to the heater element 24. For example, the controller 30 may be formed integrally with the floor panel 10 (e.g., mounted to or embedded in the surface of the support sheet 20 or the face sheet 16). The controller 30 is preferably integral to the floor panel 10 to facilitate installation and control (e.g., reducing wiring requirements, etc.), but need not be integral in the broadest sense of the invention as will be appreciated.

The controller 30 receives power from an AC power bus within the aircraft via power cables 32 and strain relief block 34. As is described in more detail with respect to FIGS. 2 and 3, the controller 30 regulates AC current provided to the heater element 24 in order to heat the floor panel 10 to a desired temperature.

The heated floor panel 10 within the aircraft typically is bonded to electrical ground by one or more electrically conductive bonding straps 36. For example, FIG. 1 illustrates how bonding straps 36 are provided that bond or tie the floor panel skins represented by the support sheet 20 and face sheet 16 to electrical ground. As noted above, such bonding straps 36 provide a level of protection against electrical hazard.

Nevertheless, the AC current provided to the heater element 24 in order to generate the electro-thermal heat can result in a large reactive current in the floor panel 10 as mentioned above. Specifically, due to the large capacitive effect of the dielectric material in the heater layer 22, reactive current from the heater element 24 may travel through the heater layer 22 (as represented by small arrows). The reactive current will flow from the heater element 24 to the electrically conductive support sheet 20 and or face sheet 16, and through the bonding straps 36 to ground. Due to the resistance between the bonding straps 36 and the floor panel skins to which they are connected, the reactive current can still result in undesirably high voltages present on the surface(s) of the floor panel 10 if left unchecked. Moreover, the reactive current can vary widely as the voltage and frequency of the aircraft AC power bus are known to vary considerably.

As will be explained below with respect to FIGS. 2 and 3, the controller 30 includes a GFI circuit that monitors the reactive component of the ground fault current. The GFI circuit verifies that the reactive current through the heater layer 22 and support sheet 20/face sheet 16 is within acceptable levels. In this manner, the controller 30 can provide both protection against electrical hazard as well as validate the bonding and grounding of the panel 10. In the event the dielectric of the panel breaks down, excessive reactive and/or real current will occur and an upper limit will be exceeded resulting in the removal of power. On the other hand, if the bonding path is lost, no reactive current will be detected as there will be a loss of the return path. This also results in the controller 30 removing power.

Figure 2:
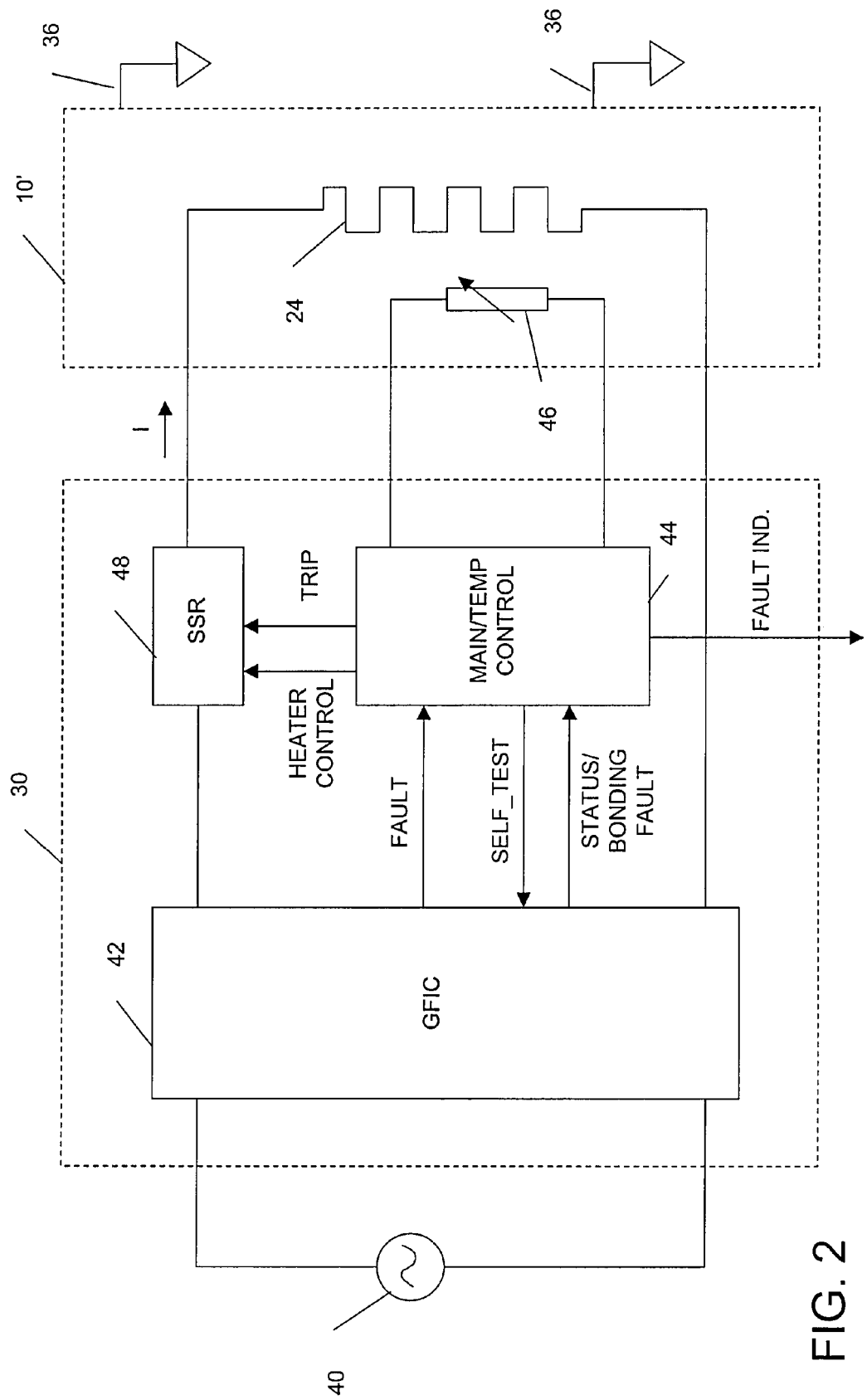
FIG. 2 is a simplified block diagram of the heated floor panel of FIG. 1 in accordance with the exemplary embodiment of the present invention.

FIG. 2 represents a block diagram of the controller 30 in accordance with the exemplary embodiment of the invention. The remainder of the floor panel 10, excluding the controller 30, is generally designated 10' in FIG. 2.

As is shown in FIG. 2, the controller 30 receives AC power from an AC power source 40 within the aircraft. The controller 30 includes a GFI circuit 42 in accordance with the invention. The GFI circuit 42 monitors the current provided to the heater element 24 to determine whether there is excess reactive current as is explained in more detail below with respect to FIG. 3. The controller 30 further includes a main/temperature controller 44 for carrying out conventional thermostatic control in the floor panel 10. Specifically, the main/temperature controller 44 includes a temperature sensor 46 mounted within the panel 10 for sensing the temperature of the floor panel 10. When the temperature of the panel 10 exceeds a setpoint temperature, the main/temperature controller 44 shuts off current delivered to the heater element 24 by way of a solid state relay (SSR) 48 included in the controller. When the temperature of the panel 10 drops below the setpoint temperature, the main/temperature controller 44 turns on the current delivered to the heater element in order to heat the panel 10. The setpoint is selectable as will be appreciated.

Those having ordinary skill in the art will appreciate that the particular design and operation of the main/temperature controller 44 is not germane to the invention in the broadest sense. For example, the main/temperature controller 44 can be any known controller such as the controller described in U.S. Pat. No. 6,691,923, or the controller described in U.S. Published Patent Application No. 2005/0150968. Moreover, the temperature sensor 46 may be located somewhere other than the floor panel 10 itself. For example, the temperature sensor 46 may be a thermostat located within the aircraft cabin to allow aircraft personnel to select a desired cabin temperature. Still further, the controller 30 need not necessarily be integral to the floor panel, as noted above, and in fact a single controller may be used to control one or more individual floor panels without necessarily departing from the broadest scope of the invention. The controller 30 may be programmed to carry out the various functions described herein by those having ordinary skill in the art of computer programming. Accordingly, additional detail regarding the particular programming code has been omitted for sake of brevity.

FIG. 2 illustrates how in the exemplary embodiment the main/temperature controller 44 provides a HEATER CONTROL signal to the SSR 48 in order to selectively allow current from the power source 40 to be delivered to the heater element 24. The main/temperature controller 44 also receives a FAULT signal from the GFI circuit 42. If the GFI circuit 42 detects a fault condition in the form of an excessive reactive current, the GFI circuit 42 notifies the controller 44 via the FAULT signal. The controller 44 in turn shuts off power to the heater element 24 via a TRIP control signal to the SSR 48 as shown in FIG. 2. If the GFI circuit 42 detects a fault condition in the form of an insufficient reactive current (indicating a bonding strap fault), the GFI circuit 42 notifies the controller 44 via a STATUS/BONDING FAULT signal. The controller 44 in turn shuts off power to the heater element via the HEATER CONTROL signal.

It will be appreciated that the HEATER CONTROL signal and the TRIP control signal from the main/temperature controller 44 may be one and the same signal, without departing from the scope of the invention. Moreover, although the FAULT signal is provided by to GFI circuit 42 to the main/temperature controller 44 in order to trip the SSR 48 in the case of a fault as shown in FIG. 2, it will be appreciated that the FAULT signal from the GFI circuit 42 could instead be provided directly to the SSR 48 as the TRIP signal. In any case, it is important that the SSR 48 be configured such that the TRIP signal overrides the HEATER CONTROL signal so as to always function to shut off current to the heater element 24 when the TRIP signal is active.

The main/temperature controller 44 in the exemplary embodiment includes a self-test routine for the GFI circuit 42. As will be explained in more detail with regard to FIG. 3, the controller 44 may be configured to issue a SELF_TEST command signal to the GFI circuit 42 to confirm the GFI circuit 42 is operational. While desirable, such self-test capability is not necessary to the present invention in it's broadest sense as will be appreciated.

Figure 3:
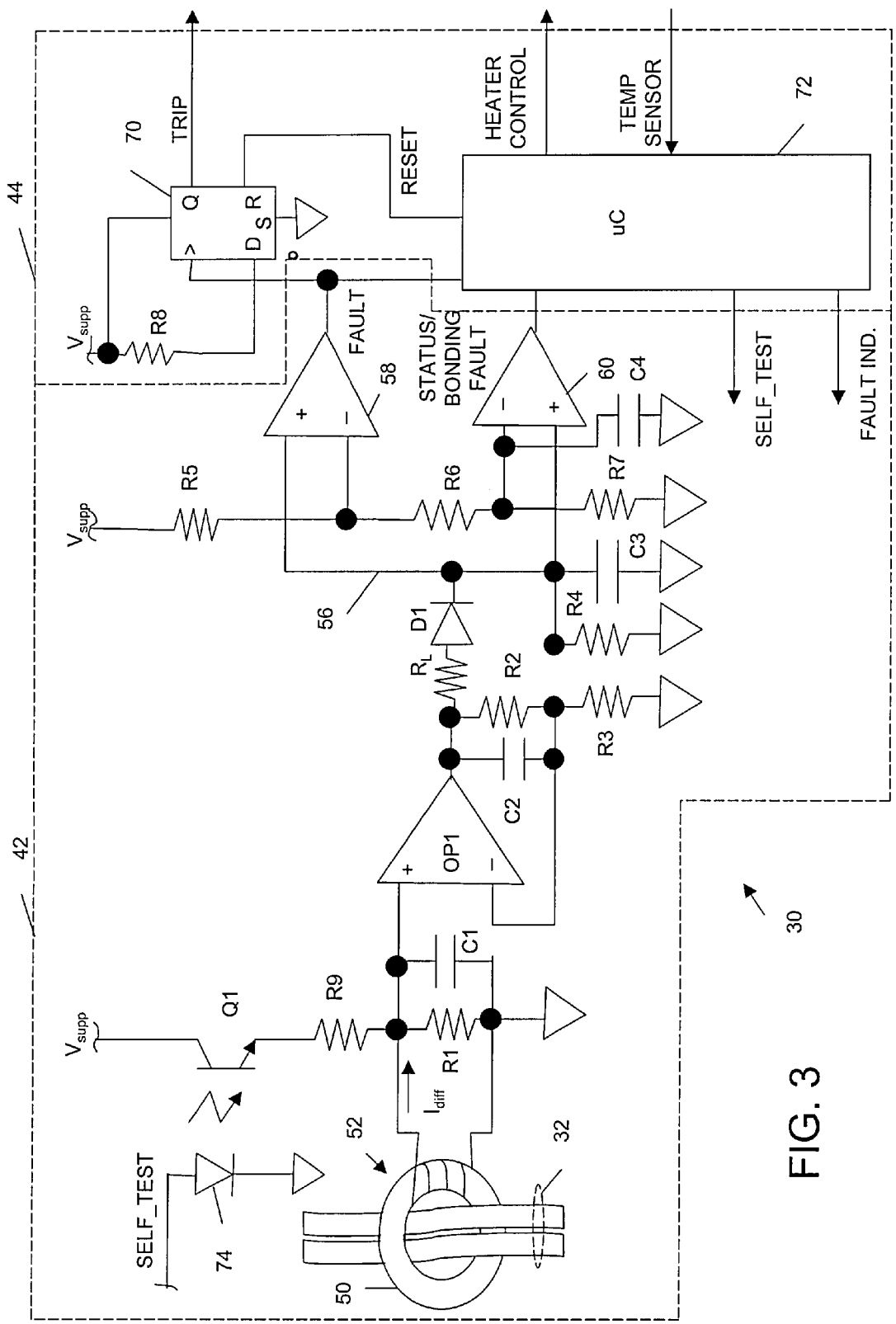
FIG. 3 is a schematic diagram of the ground fault interrupt circuit in accordance with the exemplary embodiment of the present invention.

FIG. 3 illustrates the GFI circuit 42 and main/temperature controller 44 in detail in accordance with the exemplary embodiment. The GFI circuit 42 includes a highly permeable magnetic toroid 50 through which the individual power cables 32 delivering current to and from the floor panel 10 pass. A winding 52 is provided along a portion of the toroid 50. A differential between the current that is delivered to the floor panel 10 and the current that is received back from the floor panel 10 via the power cables 32 will induce a current $I_{diff}$ in the winding 52. The magnitude of the current $I_{diff}$ will be proportional to the size of the current differential as will be appreciated.

The current $I_{diff}$ presents a voltage across resistor R1, the voltage thereby being representative of the difference in current. Since typically there will be no direct short circuits in the floor panel 10 that divert current away from the return path via the power cable 32, any difference in current represents a loss of reactive current. Should a direct short circuit occur due to a major breakdown of the dielectric, etc., the difference in current also may represent the loss of current through the short circuit. Thus, the voltage across the resistor R1 represents the amount of current provided to the floor panel 10 but lost through the dielectric of the heated layer 22 as described above, or lost via short circuit. If the voltage across the resistor R1 becomes greater than a predetermined value (upper threshold), the current provided to the floor panel 10 is considered to be excessive. On the other hand, if the voltage across the resistor R1 becomes too small or zero (lower threshold) while the floor panel is operating, it is considered that there must be a bonding failure in that too little or no reactive current is returning to electrical ground via the bonding straps 36.

As will now be explained, the voltage across the resistor R1 representing primarily the reactive current is filtered, amplified and compared using a window comparator in order to determine whether the reactive current is excessive or too small. More particularly, the GFI circuit 42 filters and amplifies the voltage across the resistor R1 and then compares the signal against an upper and lower threshold. If the signal falls outside the window, the GFI circuit 42 issues a FAULT signal and/or BONDING FAULT signal such that the SSR 48 immediately interrupts the current to the floor panel heater element 24.

Again referring to FIG. 3, a filter capacitor C1 coupled across the resistor R1 is included in the GFI circuit 42. The capacitor C1 is intended to filter out any high frequency components such as noise or interference that may be unintentionally induced into the winding 52. The voltage across the resistor R1 is input to the non-inverting input of an operational amplifier OP1 included in the GFI circuit 42. Resistors R2 and R3 are coupled between the output of the amplifier OP1 and electrical ground, with the node between the resistors being connected to the inverting input of the amplifier OP1. Consequently, the resistors R2 and R3 establish the gain of the amplifier OP1. A capacitor C2 is provided in combination with the resistors R2 and R3 to form an RC filter with high frequency roll off, again to filter away any undesirable high frequency components. In addition, the capacitor C2 may serve to compensate for increases in the reactive current component due to frequency changes in the aircraft AC power source 40.

The amplified output of the amplifier OP1 is output through current limiting resistor RL and diode D1 onto window comparator input line 56. The diode D1 allows the voltage output by the amplifier OP1 to be stored on capacitor C3. Thus, the voltage on the capacitor C3 is proportional to the differential current detected by the toroid 50. The diode D1 functions as a peak detector in that the diode D1 prevents the charge on the capacitor C3 from discharging through the resistors R2 and R3 should the differential current drop temporarily. A resistor R4 is provided to allow charge slowly to bleed off from the capacitor C3.

The voltage on the capacitor C3 is input on line 56 to the window comparator made up of comparators 58 and 60. Specifically, the voltage across the capacitor C3 is input to the non-inverting inputs of comparators 58 and 60. A string of resistors R5, R6 and R7 included in the GFI circuit 42 are coupled between a DC supply voltage Vsupp (e.g., +3.3 volts) and ground. The resistors R5, R6 and R7 are selected to provide the desired upper and lower threshold values for the window comparator. An upper threshold voltage established between resistors R5 and R6 is input to the inverting input of the comparator 58. A lower threshold voltage is established between resistors R6 and R7, and is input to the inverting input of the comparator 60. A fitering capacitor C4 is also provided at the inverting input of the comparator 60.

Thus, when current is supplied to the heater element 24 if the amount of reactive current as sensed by the toroid 52 is within the upper and lower thresholds as established by the window comparator, the outputs of the comparators 58 and 60 represent a logic "0" and logic "1", respectively. Specifically, provided the voltage across the capacitor C3 does not exceed the upper threshold voltage input to the inverting input of the comparator 58, the FAULT signal output by the comparator 58 will be a logic "0" indicating no fault. Similarly, provided the voltage across the capacitor C3 does not drop below the lower threshold voltage input to the inverting input of the comparator 60 while current is provided to the heater element 24, the STATUS/BONDING FAULT signal output by the comparator 60 will be a logic "1" indicating proper operating status.

Conversely, if the amount of reactive current as sensed by the toroid 52 falls outside the upper and lower thresholds as established by the window comparator when current is applied to the heater element 24, an appropriate fault signal is provided to the main/temperature controller 44. Specifically, if the reactive current and/or real current (due to a short) becomes excessive, the voltage across the capacitor C3 will exceed the upper threshold voltage input to the comparator 58 and the FAULT signal will become a logic "1", indicating an excessive reactive current fault. On the other hand, if the reactive current becomes too small at a time when current is provided to the heater element 24, the voltage across the capacitor C3 will drop below the lower threshold voltage input to the comparator 60 and the STATUS/BONDING FAULT signal will become a logic "0", indicating a bonding strap fault.

As is shown in FIG. 3, the main/temperature controller 44 receives the FAULT and STATUS/BONDING FAULT signals from the GFI circuit 42. The main/temperature controller 44 in the exemplary embodiment includes a D-type flip-flop 70 and a programmable microcontroller 72. The microcontroller 72 may be any type of microcontroller as will be appreciated. The microcontroller 72 is programmed to carry out known thermostat control of the floor panel based on the output of the temperature sensor 46 or the like.

The data input of the flip-flop 70 is tied to a logic "1" value (e.g., +3.3 volts) via a tie-up resistor R8. The FAULT signal from the output of the comparator 58 is provided to the clock input of the flip-flop 70. The Q output of the flip-flop represents the TRIP control signal provided to the SSR 48 (FIG. 2). The flip-flop 70 receives a RESET control signal from the microcontroller 72, and the Set terminal is tied to electrical ground.

Upon initial power up of the controller 30 or as part of a dedicated reset, the microcontroller 72 is configured to issue a RESET command to the flip-flop 70, causing the Q output to produce a TRIP output value equal to a logic "0". The SSR 48 is designed to operate normally (i.e., as controlled by the HEATER CONTROL signal provided by the main/temperature controller 44) when the TRIP signal is equal to a logic "0". Thus, as long as the value of FAULT output from the comparator 58 remains a logic "0". If, on the other hand, the reactive current becomes excessive and the value of the FAULT signal transitions to a logic "1", the flip-flop 70 clocks in the logic "1" data value and produces a TRIP signal having a logic "1" value indicating the occurrence of a fault. The SSR 48 is designed to cut off the current delivered to the floor panel 10 immediately upon the TRIP signal becoming a logic "1". Moreover, the flip-flop 70 will latch the logic "1" value of the TRIP signal and the Q output will remain unchanged unless and until the flip-flop 70 is reset by the microcontroller 72.

Upon the controller 30 being powered up and current being provided to the heater element 24, the differential current detected by the toroid 52 should at least exceed the lower threshold voltage of the comparator 60 as discussed above (indicating proper bonding of the floor panel). As a result, the value of the STATUS/BONDING FAULT signal will be a logic "1" indicating proper operation. On the other hand, if current is being provided to the heater element 24 and the differential current detected by the toroid 52 does not exceed the lower threshold voltage, the value of the STATUS/BONDING FAULT signal will be a logic "0".

The STATUS/BONDING FAULT signal is input to the microcontroller 72 which performs the conventional thermostat control by controlling the current provided to the heater element 24 via the HEATER CONTROL signal and the SSR 48. It will be appreciated that during normal operation and such times that the microcontroller 72 prevents current from being provided to the heater element 24, very little reactive current if any is expected. Accordingly, the microcontroller 72 is programmed to detect whether the STATUS/BONDING FAULT signal is appropriately a logic "1" or a fault indicative logic "0" particularly during such times that the current is being provided to the heater element 24 via the SSR 48. If the STATUS/BONDING FAULT signal is a logic "1" while current is being provided, the floor panel 10 is operating properly. If the STATUS/BONDING FAULT signal is a logic "0" while current is being provided, a bonding fault is known to have occurred.

In the event a bonding fault has occurred as determined by the microcontroller 72, the microcontroller 72 may be programmed in such case to interrupt any current delivered to the heater element 24 simply by providing a HEATER CONTROL signal to the SSR 48 that results in the current being interrupted. Alternatively, the fault may be latched via a flip-flop analogous to the FAULT signal as described above. However, the circuit must take into account the likely absence of the reactive current when current is not provided to the heater element 24 under normal operating conditions.

The microcontroller 72 may include a fault indicator output FAULT IND for providing a control signal indicating to a main control station that a fault has occurred. In addition, or in the alternative, the FAULT IND output may be used to provide some type of indication (e.g., display output, flashing light, etc.) within the cabin of the aircraft to indicate that a fault has occurred.

In accordance with the present invention, the controller 30 may also include a self-test feature. For example, FIG. 3 illustrates how the GFI circuit 42 may include a light emitting diode (LED) 74 that receives a SELF_TEST signal from the microcontroller 72. When the microcontroller 72 wishes to test the GFI circuit 42, the microcontroller 72 outputs a SELF_TEST signal having a logic "1" value. The logic "1" value causes the LED 74 to emit light that is received by a phototransistor Q1 included in the GFI circuit 42.

The phototransistor Q1 includes a collector that is tied to the DC supply voltage Vsupp, and an emitter that is connected to a pull-up resistor R9 that is tied to the resistor R1. When the LED 74 emits light, the phototransistor Q1 turns on and thereby produces a relatively large voltage across the resistor R1. The values of R1 and R9 are selected such that when the phototransistor Q1 turns on the voltage across R1 will automatically cause the voltage across the capacitor C3 to exceed the upper threshold voltage input to the comparator 58. Consequently, upon outputting a SELF_TEST signal having a logic "1" value the microcontroller 72 expects the GFI circuit 42 to trip and the FAULT signal to assume a logic "1" value assuming the GFI circuit 42 is operating properly. In order to make such a determination, the FAULT signal from the comparator 58 may also be input to the microcontroller 72 as shown in FIG. 3.

Those having ordinary skill in the art will therefore appreciate that the present invention provides a heated floor panel with a ground fault interrupt circuit that monitors the reactive component of the ground fault current. The ground fault interrupt circuit verifies that the reactive current is within acceptable levels thereby validating the bonding and grounding of the panel. In the event the dielectric of the panel breaks down, an upper limit will be exceeded resulting in the removal of power. If the bonding path is lost, no reactive current is detected, also resulting in the removal of power.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A fault protected aircraft heated floor panel, comprising:
   upper and lower floor panel skins;
   an electro-resistive heater element interposed between the upper and lower floor panel skins and separated from at least one of the upper and lower floor panel skins by a dielectric material through which a reactive current may flow between the heater element and the at least one of the upper and lower floor panel skins; and
   a controller for controlling current delivered to the heater element, the controller including a ground fault interrupt circuit that detects when current provided to the heater element falls outside of predefined upper and lower current limits, the predefined lower limit being a non-zero limit which takes into account the reactive current when the floor panel is operating in a non-fault condition,
   wherein the controller interrupts the current delivered to the heater element when the ground fault interrupt circuit detects the current falling outside of the upper and lower current limits.

2. The floor panel of claim 1, wherein the controller is integral with the remainder of the floor panel.

3. The floor panel of claim 1, wherein the ground fault interrupt circuit detects whether a differential current between a power lead and a return lead that deliver the current to the heater element falls outside of the predefined upper and lower current limits.

4. The floor panel of claim 3, wherein the ground fault interrupt circuit comprises a toroid through which both the power lead and the return lead pass in order to detect the differential current therebetween.

5. The floor panel of claim 3, wherein the ground fault interrupt circuit comprises a window comparator circuit for determining whether the differential current is within a window defining the upper and lower current limits.

6. The floor panel of claim 5, wherein the controller interrupts the current delivered to the heater element as a result of the ground fault interrupt circuit determining that the differential current is outside the window.

7. The floor panel of claim 5, wherein the lower limit of the window is representative of a fault in a connection between at least one of the upper and lower floor panel skins and electrical ground.

8. The floor panel of claim 1, wherein the controller comprises a temperature control portion that controls the current provided to the heater element as a function of a setpoint temperature for the floor panel.

9. The floor panel of claim 8, wherein the controller includes at least one solid state relay controlled by the temperature control portion to selectively provide current to the heater element.

10. The floor panel of claim 9, wherein the controller interrupts the current delivered to the heater element by switching off the at least one solid state relay as a result of the ground fault interrupt circuit detecting the excess current.

11. A method of providing fault protection in an aircraft heated floor panel, the heated floor panel including upper and lower floor panel skins and an electro-resistive heater element interposed between the upper and lower floor panel skins and separated from at least one of the upper and lower floor panel skins by a dielectric material through which a reactive current may flow between the heater element and the at least one of the upper and lower floor panel skins, the method comprising:

detecting whether current provided to the heater element included in the heated floor panel falls outside of predefined upper and lower current limits, the predefined lower limit being a non-zero limit which takes into account the reactive current when the floor panel is operating in a non-fault condition; and interrupting the current delivered to the heater element as a result of detecting the current falling outside of the upper and lower current limits.

12. The method of claim 11, wherein the step of detecting includes detecting whether a differential current between a power lead and a return lead that deliver the current to the heater element falls outside of the predefined upper and lower current limits.

13. The method of claim 12, comprising using a toroid through which both the power lead and the return lead pass in order to detect the differential current therebetween.

14. The method of claim 11, comprising using a window comparator circuit for determining whether the differential current is within a window defining the upper and lower current limits.

15. The method of claim 14, comprising interrupting the current delivered to the heater element as a result determining that the differential current is outside the window.

16. The method of claim 11, wherein the lower limit of the window is representative of a fault in a connection between at least one of the upper and lower floor panel skins and electrical ground.

17. The method of claim 11, further comprising the step of controlling the current provided to the heater element as a function of a setpoint temperature for the floor panel.

18. The method of claim 17, comprising using at least one solid state relay to selectively provide current to the heater element.

19. The method of claim 18, wherein the current delivered to the heater element is interrupted by switching off the at least one solid state relay as a result of detecting the excess current.

* * * * *